N. BAASHUUS.
PIPE JOINT.
APPLICATION FILED SEPT. 16, 1907.
906,849.
Patented Dec. 15, 1908.
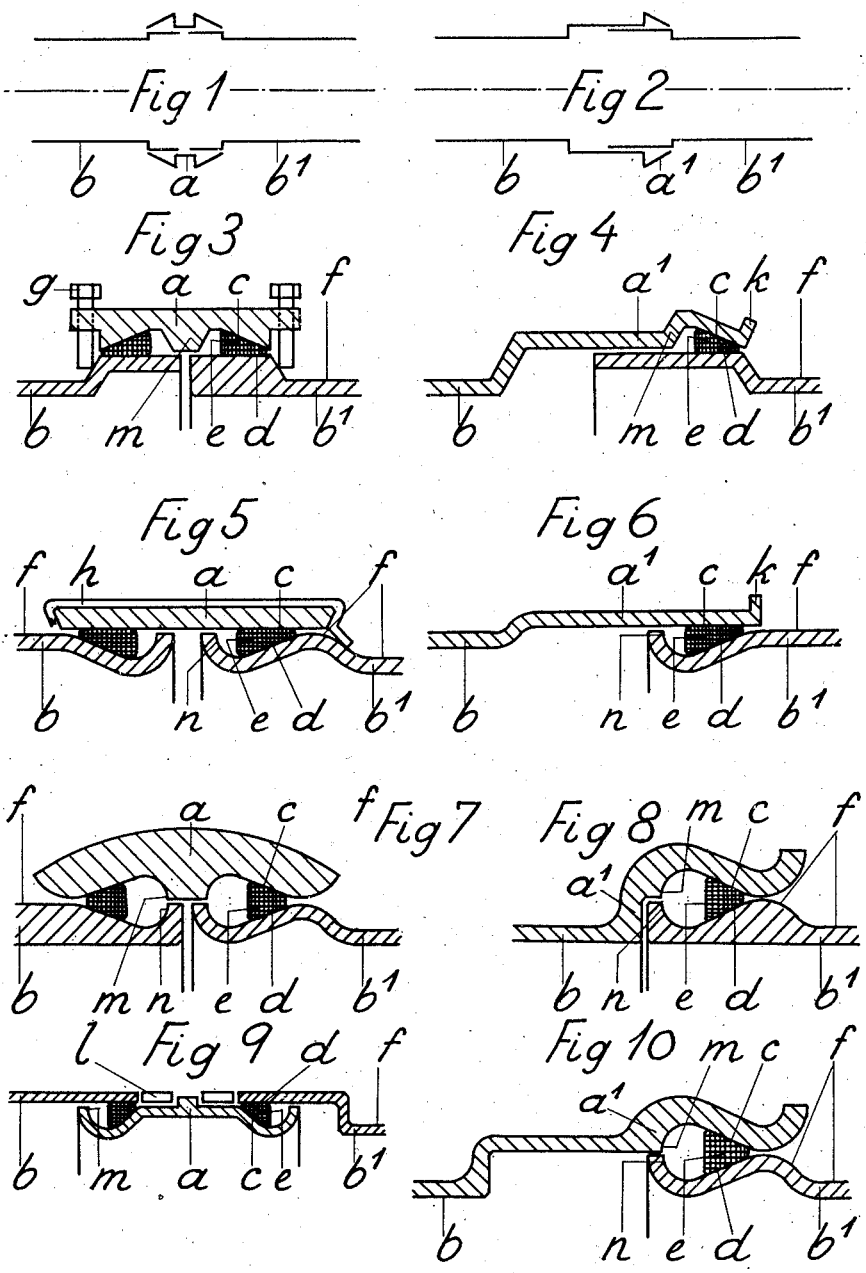

ered small as possible to prevent the gasket *e* from being forced out. The gasket is a ring, of round or other suitable cross section, of soft elastic material, and the inside pressure must have access to the rear part of the gasket, so that the latter is automatically forced into the apical portion of the conical space by the pressure in the pipes, thereby effecting a thoroughly tight joint, without the usual bolts and other auxiliary means being required. Both pipes *b*, *b*¹ have socket ends, so that the actual joint-surface *d* of the pipe lies above the pipe wall *f*. The advantage of this arrangement is that after suitably shifting the sleeve *a*, access can be had to the packing space from outside, and the gasket *e* can thus be inserted between the sleeve and the surface *d* from without. The gasket cannot slip into the inside of the pipe owing to the packing space being nearly closed on the pressure side by the rib *m* of the sleeve *a*. Screws *g* may be employed if desired to prevent the sleeve getting displaced by possible external influences.

UNITED STATES PATENT OFFICE.

NILS BAASHUUS, OF CHRISTIANIA, NORWAY.

PIPE-JOINT.

No. 906,849.　　　Specification of Letters Patent.　　　Patented Dec. 15, 1908.

Application filed September 16, 1907. Serial No. 393,042.

*To all whom it may concern:*

Be it known that I, NILS BAASHUUS, a subject of the King of Norway, residing at Christiania, Norway, have invented new and useful Improvements in Pipe-Joints, of which the following is a specification.

My invention relates to improvements in means for connecting pipes and tubes.

According to this invention the joint is packed by a ring of rubber or other soft material being forced automatically, by the pressure existing in the pipes to be connected, between converging surfaces, which are so located that the packing can be conveniently inserted, inspected or renewed without access having to be had to the interior of the pipes. The invention also admits of any individual pipe of a line of piping being readily lifted out. Mechanical operations, such as stemming or driving home etc., are obviated, nor need any bolts, flanges and the like be employed.

My invention is illustrated in the accompanying drawing, in which—

Figure 1 is a diagrammatic sectional view illustrating one form of construction of the new pipe joint, the actual packing rings being omitted. Fig. 2 is a like diagram illustrating a modification of the device. Fig. 3 is a sectional view of a fragment of the pipe joint shown in Fig. 1, drawn to a larger scale. Fig. 4 is a like view of a fragment of the pipe joint shown in Fig. 2, likewise drawn to a larger scale. Figs. 5–10 are like fragmental sectional views, drawn to the same scale as Figs. 3 and 4, of further modifications.

According to the method illustrated in Fig. 1, the two pipes *b*, *b*¹ are connected by a sleeve *a*, between which and each pipe a gasket ring is inserted. The pipes shown in Figs. 3, 5, and 7, are all connected on this method.

On the method illustrated in Fig. 2, the sleeve *a* is replaced by a socket *a*¹ on the one pipe *b*, which receives the spigot end of the other pipe *b*¹ and accommodates the gasket. The pipes shown in Figs. 4, 6 and 8 are connected according to this modified method.

Referring to Figs. 1 and 3, the two pipes *b*, *b*¹ are connected by a double-socket ring or sleeve *a* of such cross section that the surface *d* of the pipe and the surface *c* of the sleeve constitute an annular hollow cone, whose pull is parallel to the axis of the pipe. The cone is so located that its basal opening is directed toward the pressure side, the apical opening being kept as small as possible to prevent the gasket *e* from being forced out. The gasket is a ring, of round or other suitable cross section, of soft elastic material, and the inside pressure must have access to the rear part of the gasket, so that the latter is automatically forced into the apical portion of the conical space by the pressure in the pipes, thereby effecting a thoroughly tight joint, without the usual bolts and other auxiliary means being required. Both pipes *b*, *b*¹ have socket ends, so that the actual joint-surface *d* of the pipe lies above the pipe wall *f*. The advantage of this arrangement is that after suitably shifting the sleeve *a*, access can be had to the packing space from outside, and the gasket *e* can thus be inserted between the sleeve and the surface *d* from without. The gasket cannot slip into the inside of the pipe owing to the packing space being nearly closed on the pressure side by the rib *m* of the sleeve *a*. Screws *g* may be employed if desired to prevent the sleeve getting displaced by possible external influences.

Fig. 4 shows a single socket joint in which the inner pipe *b*¹ has a socket which fits into the socket *a*¹ of the outer pipe *b*. After telescoping the one pipe into the other, the gasket *e* can thus be set in position from the outside.

In the modification shown in Fig. 5 the sleeve *a* is constituted by a short plain pipe, while the ends of the pipe *b*, *b*¹ are grooved to receive the gasket *e*. Displacement of the sleeve by any possible external forces may be prevented by a clamp *h* (metal strip or the like), which fits over the sleeve and bears against the pipe; or screws may be used in the manner shown in Fig. 3. The gasket can be inserted or changed from without after shifting of the sleeve. The packing space is sufficiently closed on the pressure side by the edge *n* of the pipe to prevent the gasket getting into the interior of the piping. In order to enable closed gaskets to be employed, the pipes *b*, *b*¹ may be such as to admit of play between them, whereby the gasket can be set in place likewise from without. If, however, it is not desired to use closed gaskets, a piece of ordinary packing can be passed around the pipe and closed subsequently by means of glue or the like.

In Fig. 6 a modification is shown in which the grooved spigot of the pipe *b*¹ fits into a socket *a*¹ on the pipe *b*, a separate sleeve *a* and one of the gaskets being dispensed with. The gasket is inserted from without after separation of the two pipes.

In the modification shown in Fig. 7 both the sleeve $a$ and the two pipes $b$, $b^1$ present conical surfaces $c$, $d$ respectively, whereby annular hollow cones are constituted.

In the constructions shown in Figs. 3 and 4 the internal pressure acting upon the gasket ring $e$ tends to contract it; in the modification illustrated in Figs. 5 and 6, on the other hand, the tendency of the internal pressure is to stretch the ring $e$. In either case the alteration of length of the gasket may prove disadvantageous. With the modified construction shown in Fig. 7 alteration of the mean length of the gasket is entirely obviated or only beneficially affected. The gasket can be inserted, inspected or renewed from without after the sleeve $a$ has been pushed aside. The front edge of the sleeve may be rounded to facilitate sliding.

Fig. 8 illustrates a modification in which the pipe $b$ has a conically shaped socket $a^1$ to receive the spigot of the pipe $b^1$, there being thus no sleeve and only one gasket $e$. The latter can be conveniently inserted from without after separation of the two pipes.

In Figs. 3, 5 and 7 the long members (pipes) are located inside the short members (sleeve). It is obvious, however, that the arrangement may be reversed, a short member being located inside two long ones (pipes). Such an arrangement is illustrated in Fig. 9, where a short muff $a$ is inserted in the pipes $b$, $b^1$. Strips $l$ or the like may be employed to secure the sleeve in position.

In order to resist the wedging action of the packing, those parts of the joint which are subject to increased tensile strain must be made particularly strong. In the case of the constructions shown in Figs. 3, 5 and 7 sufficient strength can be conveniently insured by suitable thickness of the walls of the sleeve employed. In the constructions shown in Figs. 4, 6, 8 and 9, for the purpose of obtaining adequate strength without the walls of the entire pipe (in the case of rolled pipes) having to be made thicker, only the end portions, subject to the extra strain, are rendered stronger, which may be done by a rolled on flange $k$, shrunk on rings or the like.

When no separate sleeve is employed, as is the case with the constructions shown in Figs. 4, 6 and 8, it is desirable for the purpose of admitting of new packing being inserted that each individual pipe should allow of being shifted in axial direction without the neighboring pipes being disturbed and without the gasket at one end falling out on a new gasket being inserted at the opposite end. For this purpose the socket portions of the pipes should be of ample length, as illustrated in Figs. 4 and 6, so that when the one end of the pipe is shifted for the purpose of changing the gasket, the packing space at the other end remains covered. When such arrangement is not adopted, as in the case of inclined or vertical piping, shorter sockets are used as shown in Fig. 8, so that the spigot of the one pipe butts against the shoulder of the socket of the other. The construction illustrated in Fig. 8 if modified as shown in Fig. 10 would also admit of shifting of any individual pipe without disturbance of the adjacent ones.

In the event of separate sleeves or internal muffs being used (as shown in Figs. 3, 5, 7 and 9) a broken pipe can be simply lifted out after the sleeve or muff has been pushed aside. Where there is no sleeve or muff used some of the neighboring pipes must also be shifted before the broken pipe can be removed, but the packing of such joints is not disturbed.

In the various joints illustrated in the drawing a conical packing space is shown with straight walls $c$, $d$. It is evident, however, that this form is not strictly necessary, but one at least of the two telescoping members must present a groove (whose walls may be straight or curved) and the coöperating member must cover the groove in such manner that a packing space is constituted which tapers toward the outside and has relatively very narrow openings at each side.

Having thus described my invention, I declare that what I claim is—

1. A pipe joint, comprising, a tubular member presenting an annular groove and a second tubular member fitting the same telescopically and covering the groove so that an annular chamber is constituted tapering toward the outside and having a relatively narrow opening at each side, which chamber is readily accessible from without on axial sliding of the one member, that bounding wall of the chamber which is formed by the inner of the two members lying out of alinement with the exterior wall of the body of the member, and a packing ring of soft flexible and elastic material located in said chamber and pressed toward the outer opening of the latter under the action of the fluid pressure behind the packing, substantially as described.

2. A pipe joint, comprising, two pipes and a sleeve fitting the same telescopically, there being presented between it and each pipe an annular chamber tapering toward the outside and having a relatively narrow opening at each side, which chamber is readily accessible from without on relative axial motion of the sleeve and pipe, that bounding wall of the chamber which is constituted by the inner of the two telescopic members lying out of alinement with the exterior wall of the body of the member, and a packing ring of soft flexible and elastic material located in each chamber and pressed toward the outer opening of the latter under the action of the fluid pressure behind the packing, substantially as described.

3. A pipe joint, comprising, two pipes the end of each of which presents an annular groove, and a sleeve consisting of a short plain pipe embracing the two grooved ends whereby an annular chamber is constituted tapering toward the outside and having a relatively narrow opening at each side which chamber is readily accessible from without on axial sliding of the sleeve on the pipes, and a packing ring of soft flexible and elastic material located in each chamber and pressed toward the outer opening of the latter under the action of the fluid pressure behind the packing, substantially as described.

4. A pipe joint, comprising, two pipes the end of each of which presents an annular groove, and a sleeve consisting of a short plain pipe embracing the two grooved ends whereby an annular chamber is constituted tapering toward the outside and having a relatively narrow opening at each side, which chamber is readily accessible from without on axial sliding of the sleeve on the pipes, and a packing ring of soft flexible and elastic material located in each chamber and pressed toward the outer opening of the latter under the action of the fluid pressure behind the packing, and means for preventing the sleeve accidentally shifting on the pipes, substantially as described.

5. In combination, a tubular member, and two further tubular members fitting the ends of the same telescopically, the one member of each two intertelescoping members presenting an annular groove and the coöperating member closing the groove, so that an annular chamber is constituted tapering toward the outside and having a relatively narrow opening at each side, which chamber is readily accessible from without on axial sliding of the one member, that bounding wall of the chamber which is formed by the inner of the two members lying out of alinement with the exterior wall of the body of the member, and a packing ring of soft flexible and elastic material located in each chamber and pressed toward the outer opening of the latter under the action of the fluid pressure behind the packing, the permissible extent of telescopic movement of each two intertelescoping members being such that the packing in the distal-end joint remains in its groove when the one intertelescoping member is axially slid so much relatively to the coöperating member that the groove at the proximal joint is sufficiently exposed for removal of its packing, substantially as described.

NILS BAASHUUS.

Witnesses:
    EMIL G. PRILLWITZ,
    KENNETH ROMANES.